US007310043B2

(12) United States Patent
Mamaloukas

(10) Patent No.: US 7,310,043 B2
(45) Date of Patent: Dec. 18, 2007

(54) SYSTEM FOR AUTOMATICALLY MOVING ACCESS BARRIERS AND METHODS FOR ADJUSTING SYSTEM SENSITIVITY

(75) Inventor: Jason L. Mamaloukas, Pensacola, FL (US)

(73) Assignee: Wayne-Dalton Corp., Mt. Hope, OH (US)

( * ) Notice: Subject to any disclaimer, the term of this patent is extended or adjusted under 35 U.S.C. 154(b) by 327 days.

(21) Appl. No.: 10/962,224

(22) Filed: Oct. 8, 2004

(65) Prior Publication Data

US 2006/0077035 A1 Apr. 13, 2006

(51) Int. Cl.
*H04Q 1/00* (2006.01)
*G05B 19/00* (2006.01)

(52) U.S. Cl. .................... 340/5.61; 340/5.71; 340/5.23

(58) Field of Classification Search ............... 340/5.61, 340/5.62, 5.63, 5.71, 5.22, 5.23, 5.2, 10.1
See application file for complete search history.

(56) References Cited

U.S. PATENT DOCUMENTS

| | | | | |
|---|---|---|---|---|
| 4,663,626 | A * | 5/1987 | Smith | 340/825.69 |
| 4,754,255 | A * | 6/1988 | Sanders et al. | 307/10.4 |
| 5,243,652 | A | 9/1993 | Teare et al. | 380/21 |
| 5,504,482 | A | 4/1996 | Schreder | 340/995 |
| 5,519,403 | A | 5/1996 | Bickley et al. | 342/352 |
| 5,559,520 | A | 9/1996 | Barzegar et al. | 342/357 |
| 5,646,701 | A * | 7/1997 | Duckworth et al. | 340/825.69 |
| 5,678,182 | A | 10/1997 | Miller et al. | 455/33.1 |
| 5,689,269 | A | 11/1997 | Norris | 342/357 |
| 5,699,055 | A | 12/1997 | Dykema et al. | 340/825.22 |
| 5,969,637 | A | 10/1999 | Doppelt et al. | 340/825.69 |
| 5,990,828 | A | 11/1999 | King | 342/359 |
| 6,002,332 | A * | 12/1999 | King | 340/545.1 |
| 6,049,289 | A * | 4/2000 | Waggamon et al. | 340/5.23 |
| 6,181,255 | B1 * | 1/2001 | Crimmins et al. | 340/825.69 |
| 6,229,988 | B1 | 5/2001 | Stapefeld | 455/38.3 |
| 6,236,333 | B1 * | 5/2001 | King | 340/5.61 |
| 6,271,765 | B1 | 8/2001 | King et al. | 340/825.69 |
| 6,285,931 | B1 | 9/2001 | Hattori et al. | 701/29 |
| 6,388,559 | B1 * | 5/2002 | Cohen | 340/5.71 |
| 6,429,768 | B1 | 8/2002 | Flick | 340/5.2 |
| 6,448,894 | B1 | 9/2002 | Desai | 340/505 |
| 6,512,466 | B2 | 1/2003 | Flick | 340/989 |
| 6,535,143 | B1 | 3/2003 | Miyamoto et al. | 340/933 |
| 6,593,845 | B1 | 7/2003 | Friedman et al. | 340/10.33 |
| 6,616,034 | B2 | 9/2003 | Wu et al. | 235/375 |

(Continued)

FOREIGN PATENT DOCUMENTS

| | | |
|---|---|---|
| DE | 299 01 677 | 2/2003 |

(Continued)

*Primary Examiner*—Edwin C. Holloway, III
(74) *Attorney, Agent, or Firm*—Renner Kenner Greive Bobak Taylor & Weber

(57) ABSTRACT

An operator system and related methods for automatically controlling access barriers including a controller associated with at least one access barrier and a transceiver associated with the controller for transmitting and receiving operational signals. The system also includes at least one proximity device capable of communicating operational signals with the transceiver based upon a position of the proximity device with respect to the barrier and/or the operational status of a vehicle carrying the proximity device, wherein the controller monitors the operational signals and controls the position of the access barrier based upon the operation signals. Such a system allows for hands-free operation of the access barrier.

25 Claims, 10 Drawing Sheets

U.S. PATENT DOCUMENTS

| | | | | |
|---|---|---|---|---|
| 6,621,406 | B2 * | 9/2003 | Kumano | 340/5.62 |
| 6,634,408 | B2 | 10/2003 | Mays | 160/188 |
| 2003/0016139 | A1 | 1/2003 | Teich | 340/825.22 |
| 2003/0043021 | A1 | 3/2003 | Chung | 340/5.71 |
| 2004/0012483 | A1 | 1/2004 | Mays | 340/5.71 |
| 2004/0178882 | A1 | 9/2004 | Roz et al. | |
| 2004/0239482 | A1 | 12/2004 | Fitzgibbon | 340/5.61 |
| 2006/0038656 | A1 | 2/2006 | Wilson | 340/5.61 |

FOREIGN PATENT DOCUMENTS

| | | | |
|---|---|---|---|
| EP | 0 965 710 | A | 12/1999 |
| EP | 1 026 354 | A2 | 8/2000 |
| EP | 1 176 392 | A1 | 1/2002 |
| EP | 1 184 236 | | 3/2002 |
| WO | WO 99/63363 | | 12/1999 |
| WO | WO 2005/066442 | A1 | 7/2005 |

* cited by examiner

SYSTEM FOR AUTOMATICALLY MOVING ACCESS BARRIERS AND METHODS FOR ADJUSTING SYSTEM SENSITIVITY

TECHNICAL FIELD

Generally, the present invention relates to an access barrier control system, such as a garage door operator system for use on a closure member moveable relative to a fixed member and methods for programming and using the same. More particularly, the present invention relates to the use of proximity devices, such as a transponder to determine the position of a carrying device, such as an automobile, to influence the opening and closing of an access barrier depending upon the position of the carrying device relative to the access barrier. Specifically, the present invention relates to a proximity device that is directly powered by the carrying device and initiates movement of the barrier depending upon a change in the operational status of the automobile and wherein the positional sensitivity of the transponder, which may also initiate movement of the barrier, may be adjusted.

BACKGROUND ART

When constructing a home or a facility, it is well known to provide garage doors which utilize a motor to provide opening and closing movements of the door. Motors may also be coupled with other types of movable barriers such as gates, windows, retractable overhangs and the like. An operator is employed to control the motor and related functions with respect to the door. The operator receives command input signals—for the purpose of opening and closing the door—from a wireless remote, from a wired wall station, from a keyless entry device or other similar device. It is also known to provide safety devices that are connected to the operator for the purpose of detecting an obstruction so that the operator may then take corrective action with the motor to avoid entrapment of the obstruction.

To assist in moving the garage door or movable barrier between limit positions, it is well known to use a remote radio frequency (RF) or infrared transmitter to actuate the motor and move the door in the desired direction. These remote devices allow for users to open and close garage doors without having to get out of their car. These remote devices may also be provided with additional features such as the ability to control multiple doors, lights associated with the doors, and other security features. As is well documented in the art, the remote devices and operators may be provided with encrypted codes that change after every operation cycle so as to make it virtually impossible to “steal” a code and use it a later time for illegal purposes. An operation cycle may include opening and closing of the barrier, turning on and off a light that is connected to the operator and so on.

Although remote transmitters and like devices are convenient and work well, the remote transmitters sometimes become lost, misplaced or broken. In particular, the switch mechanism of the remote device typically becomes worn after a period of time and requires replacement. Moreover, use of the remote transmitter devices require the use of batteries which also necessitate replacement after a period of time. And although it is much easier to actuate the remote transmitter than for one to get out of an automobile and manually open the door or access barrier, it is believed that the transmitter and related systems can be further improved to obtain “hands-free” operation. Although there are some systems that utilize transponders for such a purpose, these systems still require the user to place an access card or similar device in close proximity to a reader. As with remote transmitters, the access cards sometimes become lost and/or misplaced. A further drawback of these access cards is that they do not allow for programmable functions to be utilized for different operator systems and as such do not provide an adequate level of convenience.

Another type of hands-free system utilizes a transponder, carried by an automobile, that communicates with the operator. The operator periodically sends out signals to the transponder and when no return signal is received, the operator commands the door to close. Unfortunately, the door closing may be initiated with the user out of visual range of the door. This may lead to a safety problem inasmuch as the user believes that the door has closed, but where an obstruction may have caused the door to open and remain open thus allowing unauthorized access.

U.S. patent application Ser. No. 10/744,180, assigned to the assignee of the present application and incorporated herein by reference, addresses some of the shortcomings discussed above. However, the disclosed system does not provide specific auto-open and auto-close functionality in association with the vehicle’s operational status. And the disclosed system does not provide for user-changeable sensitivity adjustments. Implementing a hands-free system that has universal settings for all home installations is extremely difficult. If one designs for optimum RF range, then the opening range of the barrier is improved, but in contrast, the closing range ends up being too high. If one does not design for optimum RF range then in worst case home installations, the opening RF range might not be sufficient. In other words, if the RF signal is too strong, the barrier opens at a distance relatively far away, but closes only out of sight of the user. Or, if the RF signal is too weak, then the user must wait for the barrier to open before entering the garage. Situations may also arise where a designated sensitivity level causes the operator to toggle between opening and closing cycles before completion of a desired cycle. Other patents teach other types of transponder systems.

U.S. Pat. No. 6,616,034 to Wu, et al. discloses an identification system for tracking wafer carriers within a manufacturing facility. The system uses smart card technology in which an identification card is placed on each wafer carrier. The smart cards have memory for storing information about the wafer carrier. Power is transmitted to the card along with data so that the smart card does not require a separate power source. The devices for communicating with the smart cards can be stationary or they can be portable hand-carried devices. A network connects the readers to a central database.

U.S. Pat. No. 6,593,845 to Friedman, et al. discloses an active RF transponder that is provided with a wake-up circuit that wakes the RF transponder from a sleep state upon detection of an RF interrogating signal. The active RF transponder includes a battery, an antenna adapted to receive RF signals from an interrogator, and electronic circuitry providing the various RF transponder functions of sending/receiving signals and storing data. A first embodiment of the invention includes a wake-up circuit that periodically checks for the presence of an RF signal at the antenna. The wake-up circuit is coupled to the antenna and includes a switch adapted to selectively couple the battery to the electronic circuitry and provide electrical power thereto upon detection of the RF signals by the antenna. The wake-up circuit further comprises an oscillator providing a clock signal having a low duty cycle that defines intervals during which the antenna is sampled for presence of the RF signals (e.g., approximately 20 nanoseconds every 100 microseconds). A second embodiment of the RF transponder includes a wake-up circuit as in the first embodiment that is further adapted to detect a code sequence modulated in the RF signals. The code sequence is unique for a class of RF transponder, so the wake-up circuit can discriminate between interrogating signals. A third embodiment of the RF transponder includes a wake-up circuit that wakes the RF transponder upon detection of an RF signal that contains data within a desired band of frequencies. This embodiment enables the RF transponder to discriminate between RF signals that likely contain valid data and other RF noise. After the RF transponder has been awakened, the wake-up circuit returns the RF transponder to a sleep state if valid data is not detected within a predetermined period of time. Unfortunately, these embodiments are not connectable to an ignition system of the vehicle without an additional transmitter and receiver to inform the transponder of the ignition status.

U.S. Pat. No. 6,535,143 to Miyamoto, et al. discloses a transponder that is selectively mounted on a vehicle. The transponder receives its operational energy through magnetic coupling with a ground loop coil when the vehicle comes over the loop coil, and transmits predetermined information specific to the vehicle to the vehicle detection circuit. The vehicle detection circuit determines from the information received from the transponder whether the detected vehicle is a predetermined vehicle. This system was also found lacking in that no input is receivable from the ignition.

U.S. Pat. No. 6,512,466 to Flick discloses a vehicle tracking unit that preferably includes a vehicle position determining device, a wireless communications device, a back-up battery, and a controller connected to the wireless communications device and the vehicle position determining device. The vehicle position determining device, wireless communications device and controller define a power load of the vehicle tracking unit. The controller may isolate the back-up battery from the power load as a voltage of the vehicle battery drops until reaching a threshold. After reaching the threshold, the controller causes the back-up battery to selectively power only a first portion of the power load while a second portion of the power load remains powered by the vehicle battery. The selectively powered portion from the back-up battery may be the wireless communications device, for example, which may have a higher operating voltage. The disclosed device is effective in tracking entities such as vehicles, but it does not provide an adequate teaching in regard to the status of the ignition or the vehicle's battery.

U.S. Pat. No. 6,429,768 to Flick discloses a vehicle control system which includes a radio transponder to be carried by a user, and a radio transponder reader at the vehicle for generating control signals to enable at least one vehicle function based upon receiving a desired radio signal from the radio transponder when positioned in proximity to the reader. A jammer radio transmitter at the vehicle selectively prevents the radio transponder reader from receiving the desired radio signal from the radio transponder based upon a controller, such as an alarm controller of a vehicle security system, especially an after-market security system. The controller preferably includes a receiver for receiving remotely generated signals to operate the jammer radio transmitter. The control system may also include a remote transmitter for generating control signals to be received by the receiver. For example, the remote transmitter may be a portable transmitter carried by the user, or may be a satellite, cellular or paging transmitter remote from the vehicle. A vehicle anti-hijack switch may control the transponder jammer. The at least one vehicle function may be operation of a vehicle engine or control of the vehicle door locks. However, this is a costly approach to activate the transponder and the system does not adequately address transponder sensitivity issues.

U.S. Pat. No. 6,285,931 to Hattori, et al. discloses a vehicle diagnosis information communication system, wherein electric power is supplied from a battery to a vehicle control computer mounted on the vehicle during a period of vehicle operation, while the electric power is supplied to a radio communication unit mounted on the vehicle irrespective of the vehicle operation. The computer transmits vehicle information such as engine diagnosis results to the radio communication unit through a communication line. The radio communication unit communicates the received vehicle information to an external site of communication in response to a request of the information from the external site of communication irrespective of the supply of the electric power to the computer. Preferably, the supply of the electric power from the battery to the computer is maintained for a predetermined period after the vehicle operation.

U.S. Pat. No. 6,229,988 to Stapefeld, et al. discloses a signal receiving apparatus as, for example, that used in the monitoring a stolen vehicle transceiver for the presence of sequential transmitted signals specifically requesting that transceiver to respond to enable tracking of the vehicle. The receiver is powered by a consumable energy source of predetermined budgeted lifetime and adapted to operate between quiescent energy-saving and energized energy-consuming states for performing various functions. A method and apparatus is disclosed for insuring the availability of energy to be able to perform such functions within said predetermined budgeted life time. The method includes steps allocating budget time intervals for periodically operating the receiver intermittently in an energized state to enable the performing of such functions as monitoring for such signals; and, in the event of inordinate energy consumption during such operation, that, if continued, would render the operation out of overall allocated time budget. The method also includes adaptively skipping time intervals with the receiver quiescent, sufficiently to get the operation back on overall time budget.

Therefore, there is a need in the art for a system that automatically moves access barriers depending upon the direction of travel of a device carrying a proximity device such as a transponder. And there is a need for the system to also consider the operational status of the device and which provides for a user-changeable sensitivity adjustment for the proximity device.

DISCLOSURE OF THE INVENTION

One of the aspects of the present invention, which shall become apparent as the detailed description proceeds, is attained by an operator system for automatically controlling access barriers, comprising a controller associated with at least one access barrier, at least one beacon transceiver associated with the controller for transmitting and receiving operational signals, and at least one proximity device adapted to be associated with a powered carrying device, the at least one proximity device capable of communicating operational signals with the at least one beacon transceiver based upon an operational status of the powered carrying device and a position of the proximity device with respect to the barrier, wherein the controller monitors the operational signals and controls the position of the access barrier based upon the operational signals.

Still yet another aspect of the present invention is attained by an operator system for automatically controlling access barriers, comprising a controller associated with at least one access barrier, at least one beacon transceiver associated with the controller for transmitting and receiving operational signals, and at least one proximity device adapted to be associated with a powered carrying device, the at least one proximity device capable of communicating operational signals with the at least one beacon transceiver, wherein the controller monitors the operational signals and controls the position of the access barrier based upon the operational signals and wherein the at least one proximity device emits the operational signals at least one of two sensitivity levels.

A further aspect of the present invention is attained by a method for automatically controlling operation of an access barrier based upon a relative position of a vehicle with respect to the barrier, comprising providing a controller to control the opening and closing movements of the access barrier, carrying a proximity device in the vehicle, communicating between the proximity device and the controller a relative position of the vehicle with respect to the access barrier, detecting and confirming by the controller that when the carrying device is approaching the access barrier in a closed condition, said controller automatically opens the access barrier, and detecting and confirming by the controller that when the carrying device is moving away from the access barrier in an open condition, the controller automatically closes the access barrier.

Still further aspect of the present invention is attained by a method for adjusting power sensitivity of a hands-free proximity device used to initiate automatic movement of an access barrier, comprising providing a controller to control the opening and closing movements of the access barrier, providing a proximity device with a learn button, actuating the learn button to associate the proximity device with the controller, and adjusting power levels on one of the proximity device and the controller to change the power sensitivity of signals transmitted therebetween.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
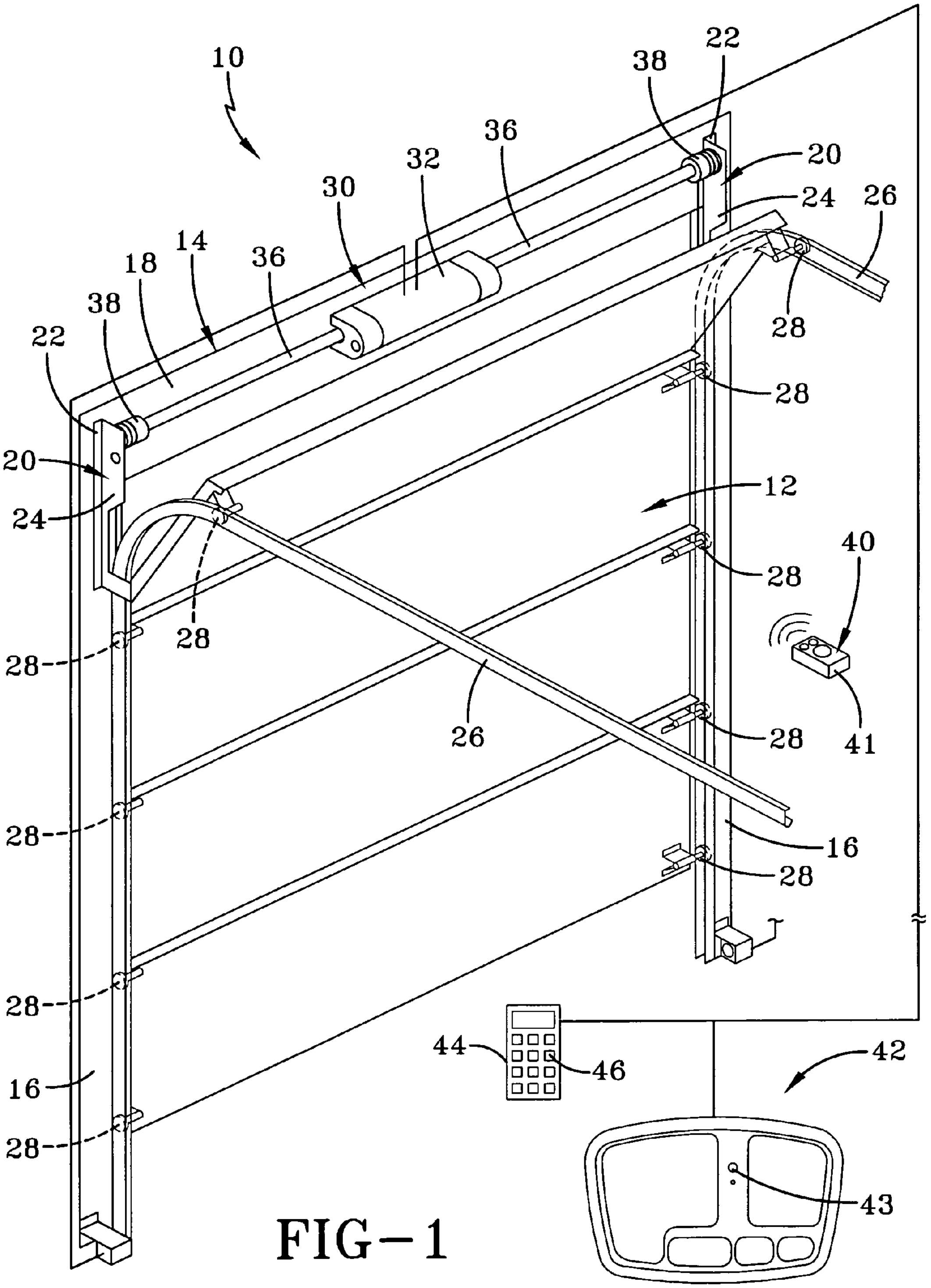
FIG. 1 is a perspective view depicting a sectional garage door and showing an operating mechanism embodying the concepts of the present invention.

A system, such as a garage door operator system which incorporates the concepts of the present invention, is generally designated by the numeral 10 in FIG. 1. Although the present discussion is specifically related to an access barrier such as a garage door, it will be appreciated that the teachings of the present invention are applicable to other types of barriers. The teachings of the invention are equally applicable to other types of movable barriers such as single panel doors, gates, windows, retractable overhangs and any device that at least partially encloses or restricts access to an area.

The system 10 is employed in conjunction with a conventional sectional garage door generally indicated by the numeral 12. The door 12 may or may not be an anti-pinch type door. The opening in which the door is positioned for opening and closing movements relative thereto is surrounded by a frame, generally indicated by the numeral 14, which consists of a pair of a vertically spaced jamb members 16 that, as seen in FIG. 1, are generally parallel and extend vertically upwardly from the ground. The jambs 16 are spaced and joined at their vertical upper extremity by a header 18 to thereby form a generally u-shaped frame 14 around the opening for the door 12. The frame 14 is normally constructed of lumber or other structural building materials for the purpose of reinforcement and to facilitate the attachment of elements supporting and controlling the door 12.

Secured to the jambs 16 are L-shaped vertical members 20 which have a leg 22 attached to the jambs 16 and a projecting leg 24 which perpendicularly extends from respective legs 22. The L-shaped vertical members 20 may also be provided in other shapes depending upon the particular frame and garage door with which it is associated. Secured to a lower end of each projecting leg 24 is a track 26 which extends perpendicularly from each projecting leg 24. Each track 26 receives a roller 28 which extends from the top edge of the garage door 12. Additional rollers 28 may also be provided on each top vertical edge of each section of the garage door to facilitate transfer between opening and closing positions.

Figure 2:
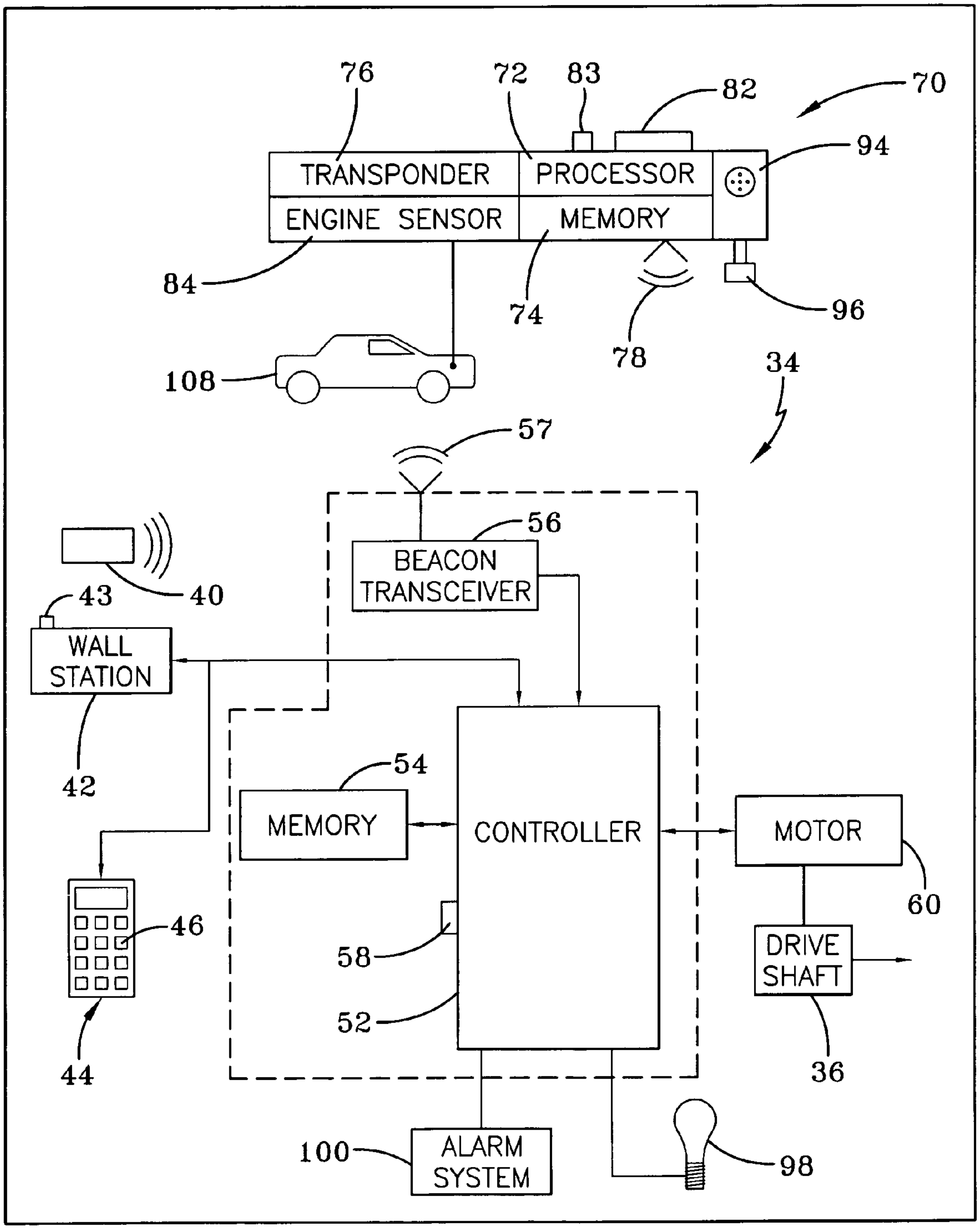
FIG. 2 is a block diagram of an operator system according to the present invention.

A counterbalancing system generally indicated by the numeral 30 may be employed to balance the weight of the garage door 12 when moving between open and closed positions. One example of a counterbalancing system is disclosed in U.S. Pat. No. 5,419,010, which is incorporated herein by reference. Generally, the counter-balancing system 30 includes an operator housing 32, which is affixed to the header 18 and which contains an operator mechanism control 34 best seen in FIG. 2. Extending through the operator housing 32 is a drive shaft 36, the opposite ends of which carry cable drums 38 that are rotatably affixed to respective upper ends of projecting legs 24. The cable drums 38 store suspension cables (not shown) that have a first end attached to the cable drum 28 and a second end attached to the lower portion of the garage door 12. Carried within the drive shaft 36 are counterbalance springs as described in the '010 patent. Although a header-mounted operator is disclosed, the control features to be discussed later are equally applicable to other types of operators used with movable barriers. For example, the control routines can be easily incorporated into trolley type, screw driver and jackshaft operators used to move garage doors or other types of access barriers. The drive shaft 36 transmits the necessary mechanical power to transfer the garage door 12 between closed and open positions. In the housing 32, the drive shaft 36 is coupled to a drive gear wherein the drive gear is coupled to a motor in a manner well known in the art.

Briefly, the operator mechanism control 34 portion of the counter-balancing system 30 may be controlled by a wireless remote transmitter 40, which has a housing 41, or a wall station control 42 that is wired directly to the system 30 or which may communicate via radio frequency or infrared signals. The wall station control 42 is likely to have additional operational features not present in the remote transmitter 40. The wall station control 42 is carried by a housing which has a plurality of buttons thereon. Each of the buttons, upon actuation, provide a particular command to the controller to initiate activity such as the opening/closing of the barrier, turning lights on and off and the like. A program button 43, which is likely recessed and preferably actuated only with a special tool, allows for programming of the control 34 for association with remote transmitters and more importantly with a proximity device as will become apparent as the description proceeds. The system 30 may also be controlled by a keyless alphanumeric device 44. The device 44 includes a plurality of keys 46 with alphanumeric indicia thereon and may have a display. Actuating the keys 46 in a predetermined sequence allows for actuation of the system 30. At the least, the devices 40, 42 and 44 are able to initiate opening and closing movements of the door coupled to the system 30. The operator mechanism control 34 monitors operation of the motor and various other connected elements. A power source is used to energize the elements in a manner well known in the art.

The operator mechanism control 34 includes a controller 52 which incorporates the necessary software, hardware and memory storage devices for controlling the operation of the operator mechanism control 34 and for implementing the various advantages of the present invention. In electrical communication with the controller 52 is a non-volatile memory storage device 54 for permanently storing information utilized by the controller in conjunction with the operation of the operator mechanism control 34. Infrared and/or radio frequency signals generated by transmitters 40, 42 and 44 are received by a receiver or beacon transceiver 56 which transfers the received information to a decoder contained within the controller. The controller 52 converts the received radio frequency signals or other types of wireless signals into a usable format. It will be appreciated that an appropriate antenna is utilized by the transceiver 56 for sending and receiving the desired radio frequency or infrared beacon signals 57 back to the various wireless transmitters. The beacon transceiver 56 is a Xemics XE 1203F supplied by Xemics of Neuchatel, Switzerland and the controller 52 is a Model MSP430F1232 supplied by Texas Instruments. Of course equivalent transceivers and controllers could be utilized.

The beacon transceiver is directly associated with the mechanism 34, or in the alternative, the beacon transceiver could be a stand-alone device that utilizes a 372 MHz transmitter that communicates with the controller. But, by having the transceiver directly associated with the controller they communicate directly with one another and the state of the door is immediately known. A sensitivity switch 58 may be associated with the controller 52. The switch 58 allows for about a 13 dBm link quality difference. In other words, a first mode could provide a −109 dBm level, while a second mode could provide a −96 dBm level. In any event, the controller 52 is capable of directly receiving transmission type signals from a direct wire source as evidenced by the direct connection to the wall station 42. And the keyless device 44, which may also be wireless, is also connected to the controller 52. Any number of remote transmitters 40*a-x* can transmit a signal that is received by the transceiver 56 and further processed by the controller 52 as needed. Likewise, there can be any number of wall stations. If an input signal is received from a remote transmitter 40, the wall station control 42, or a keyless device 44 and found to be acceptable, the controller 52 generates the appropriate electrical input signals for energizing the motor 60 which in turn rotates the drive shaft 36 and opens and/or closes the access barrier.

A proximity device transmitter 70 is included in the system 10 and effectively operates in much the same manner as the other transmitters except direct manual input from the user is not required. As will be discussed in detail, the transmitter 70 initiates movement depending upon its proximity to the controller, the transmitter's direction of travel with respect to the controller or the operational status of the vehicle that is carrying the transmitter. The proximity device 70 includes a processor 72 connected to a non-volatile memory storage device 74. The proximity device transmitter 70 is capable of receiving the transceiver signal 57 and in turn generates a proximity or an acknowledge signal 78 for communication with the transceiver and other like devices. It will be appreciated that the signals between the transceiver 56 and the proximity device transmitter 70 may be encrypted by using well known technologies. The proximity device 70 includes a mobile transceiver which is also referred to as a mobile transponder 76 that is capable of accepting a challenge or inquiry from an interrogator—which in this case is the beacon transceiver 56—and automatically transmitting an appropriate reply in the form of the proximity signal 78. The transponder is a Xemics XE 1203F and the processor 72 is a Texas Instruments MSP4301F232. Of course, other equivalent devices could be used. The processor 72 includes the necessary hardware, software and memory for receiving and generating signals to carry out the invention. The processor 72 and the memory 74 facilitate generation of the appropriate information to include in the proximity signal 78 inasmuch as one proximity device may be associated with several operators or in the event several proximity devices are associated with a single operator.

The proximity device transmitter 70 includes at least one learn button 82 and an input button 83 which allows for programming of the proximity device with respect to the controller 52. Generally, the proximity device 70 allows for "hands-free" operation of the access barrier. In other words, the proximity device 70 may simply be placed in a glove compartment of an automobile or other carrying device and communicate with the controller 52 for the purpose of opening and closing the access barrier depending upon the position of the proximity device 70 with respect to the beacon transceiver 56. As such, after programming, the user is no longer required to press an actuation button or otherwise locate the transmitter before having the garage door open and close as desired. If needed, manual actuation of the button 82 after programming may be used to override normal operation of the proximity device so as to allow for opening and closing of the barrier and also to perform other use and/or programming functions associated with the operator system 34.

The transmitter 70 may be connected directly to an engine sensor 84, such as an accessory switch, of the automobile.

As will be discussed in detail later, the engine sensor 84 determines the operational status of the carrying device and, along with determining the position of the carrying device, initiates barrier movement based on the input received. In the alternative, the sensor 84 could be a vibration sensor that is not directly connected to the carrying device's engine or motor.

Additional features that may be included with the proximity device transmitter 70 are an audio device 94 and a light device 96. It is envisioned that the audio device 94 and/or the light device 96 may be employed to provide verbal instructions/confirmation or light indications as to certain situations that need the immediate attention of the person utilizing the proximity device 70. For example, the light source may be used to provide a warning as to the state of the access barrier. The sources 94 and 96 may also provide confirmation or rejection of the attempted programming steps to be discussed later. All of the components contained with the proximity device transmitter 72 may be powered by a battery used by the carrying device or two AA batteries which ideally have a minimum two year battery life.

A light 98 is connected to the controller 52 and may be programmed to turn on and off depending upon the conditions of the proximity device and how it is associated with the controller 52. Likewise, an alarm system 100 may be activated and/or deactivated depending upon the position of the proximity device 70 with respect to the beacon transceiver 56.

Figure 3:
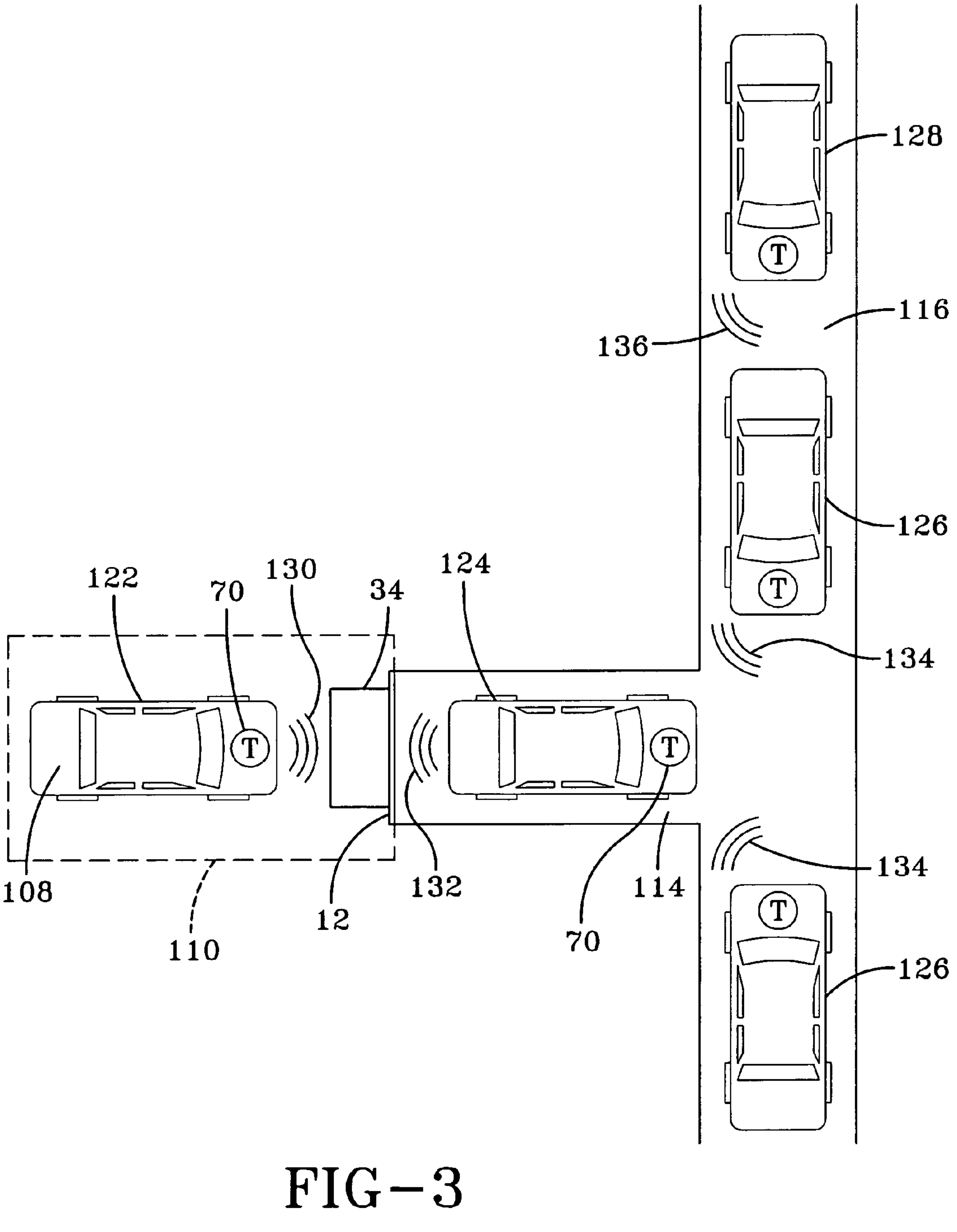
FIG. 3 is a schematic diagram of various positions of an exemplary carrying device with respect to an access barrier that utilizes the operator system according to the present invention.

Referring now to FIG. 3, a schematic diagram showing the relationship between a carrying device 108 that carries the proximity device in its various positions and the operator system 34 is shown. Typically, the carrying device is an automobile maintained in a garage or other enclosure generally indicated by the numeral 110. The enclosure 110 is separated from it's outer environs by the access barrier 12 which is controlled by the operator system 34 in the manner previously described. The enclosure 110 is accessible by a driveway 114 which is contiguous with a street 116 or other access-type road.

The carrying device 108 is positionable in the enclosure 110 or anywhere along the length of the driveway 114 and the street 116. Preferably, the carrying device is considered to be in either a "docked" state inside the enclosure 110 or in an "away" state anywhere outside the enclosure. As will become apparent, the transmitter 70 communicates with the controller based upon power thresholds required by the devices to communicate with one another. To assist in understanding the states and the power thresholds, specific reference to positions of the carrying device with respect to the enclosure are provided. In particular, it is envisioned that a park position 122 is for when the automobile or other carrying device is positioned within the enclosure 110. An action position 124 designates when the carrying device 108 is immediately adjacent the barrier 12, but outside the enclosure and wherein action or movement of the barrier 12 is likely desired. An energization position 126, which is somewhat removed from the action position 124, designates when an early communication link between the transponder 76 and the transceiver 56 needs to be established in preparation for moving the barrier 12 from an open to a closed position or from a closed position to an open position. Further from the energization position(s) 126 is a dormant position 128 for those positions where energization or any type of activation signal communicated between the transponder and the operator system is not recognized until the energization position(s) 126 is obtained.

Figure 4:
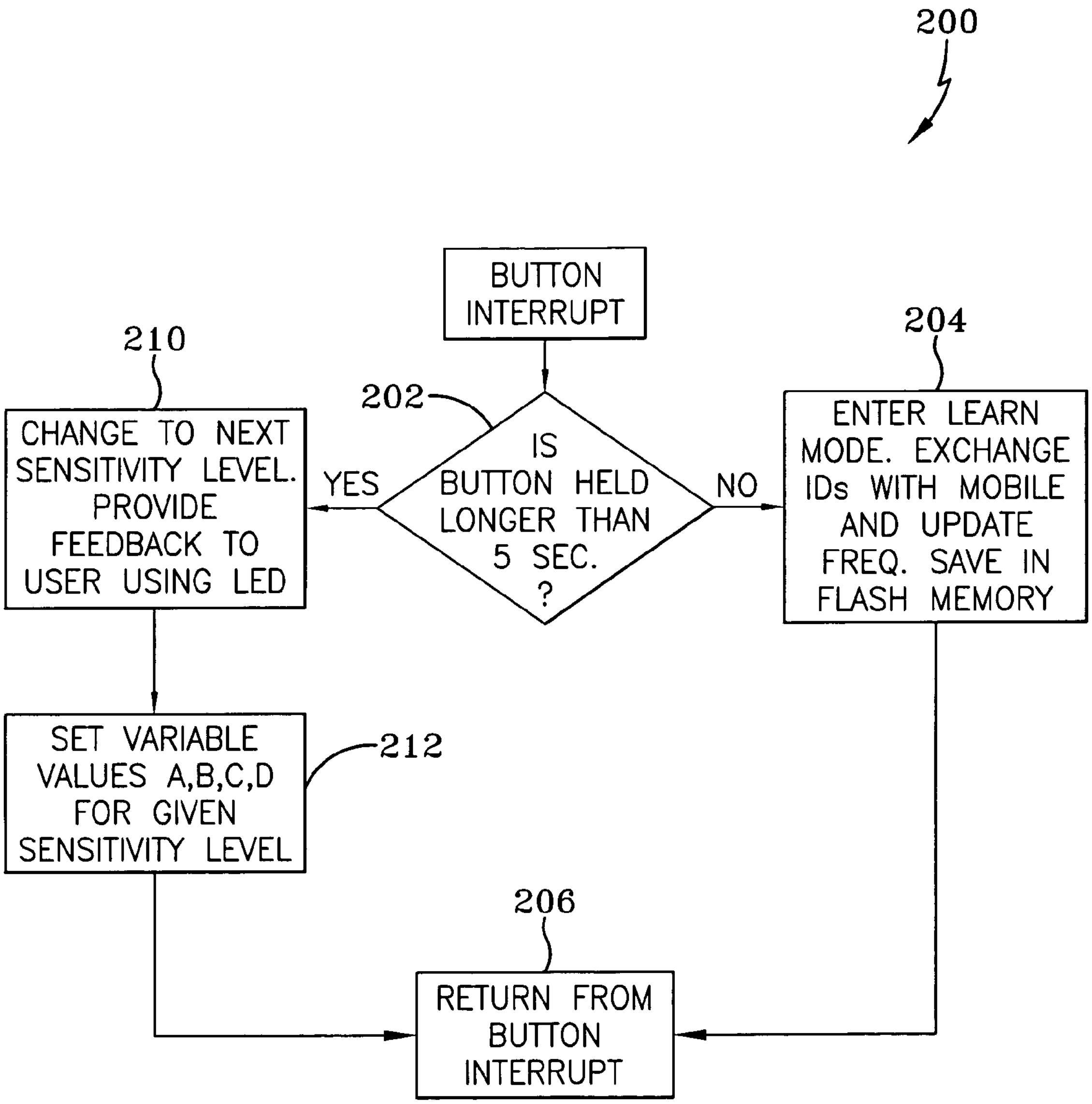
FIG. 4 is an operational flowchart illustrating the learning of a proximity device to a beacon transceiver and the setting of the beacon transceiver's sensitivity according to the present invention.
Figure 5:
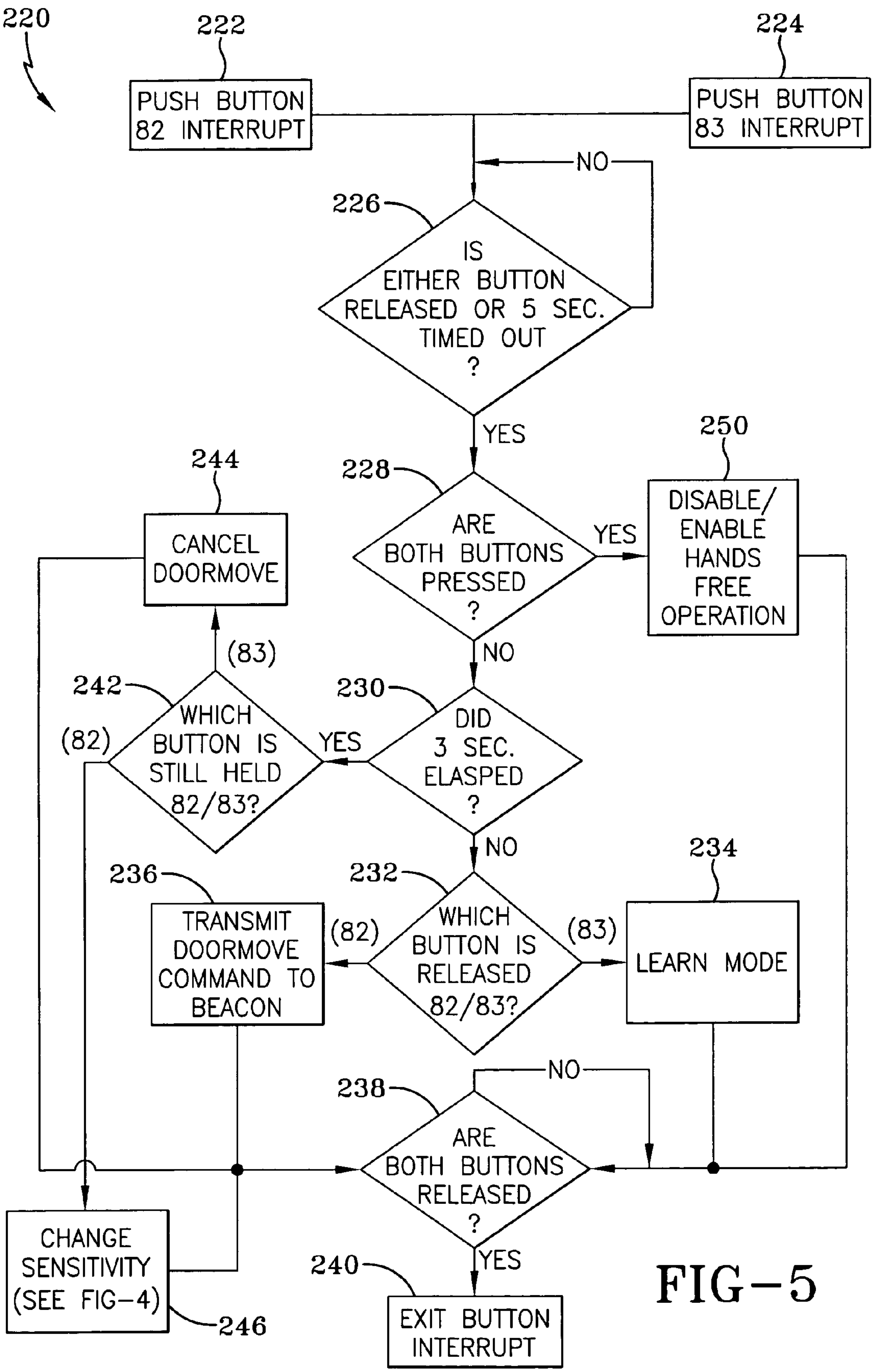
FIG. 5 is an operational flowchart illustrating use and programming of the proximity device according to the present invention.
Figure 6:
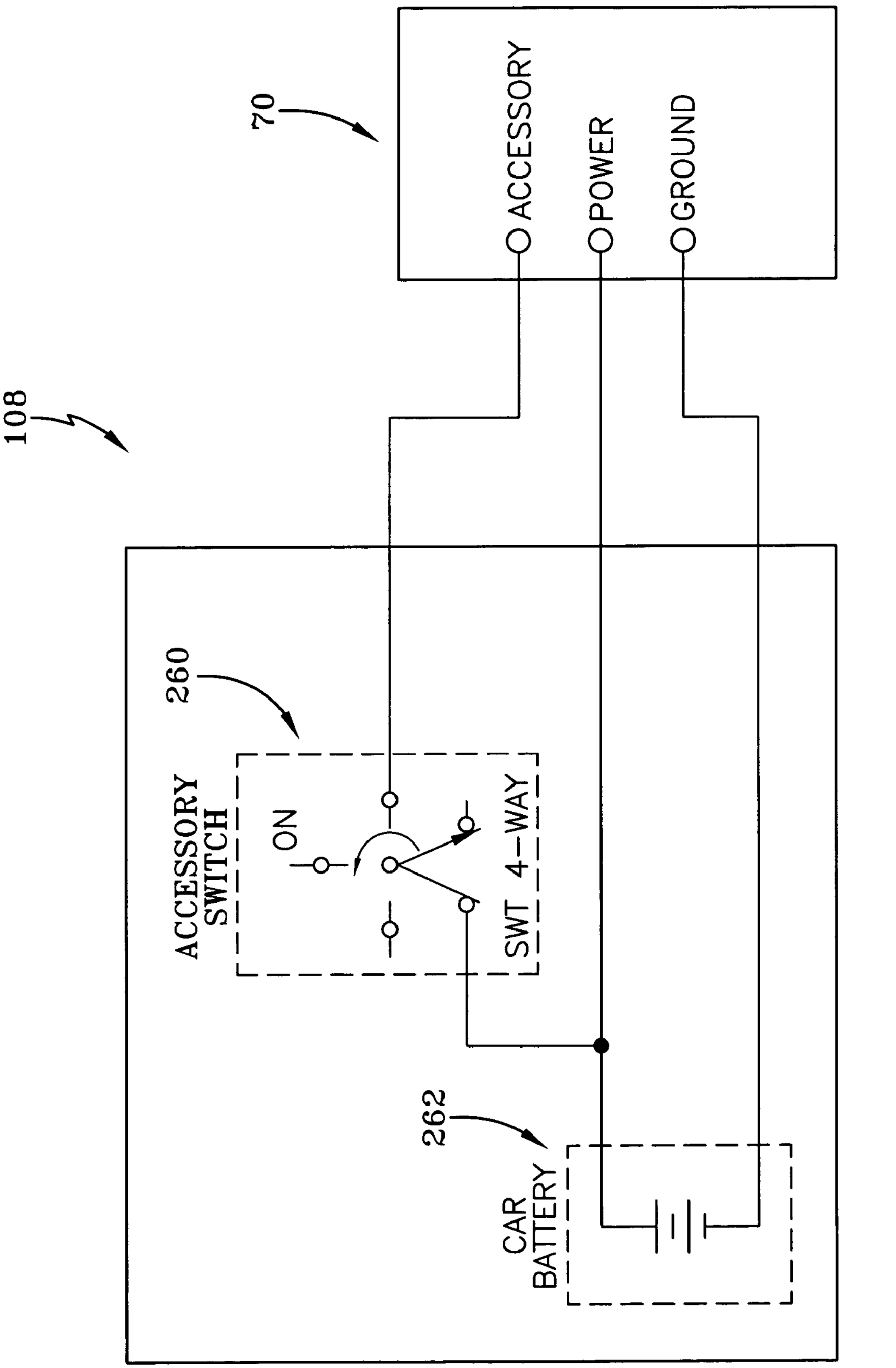
FIG. 6 is a schematic diagram of the proximity device connected to a carrying device's power source.
Figure 7A:
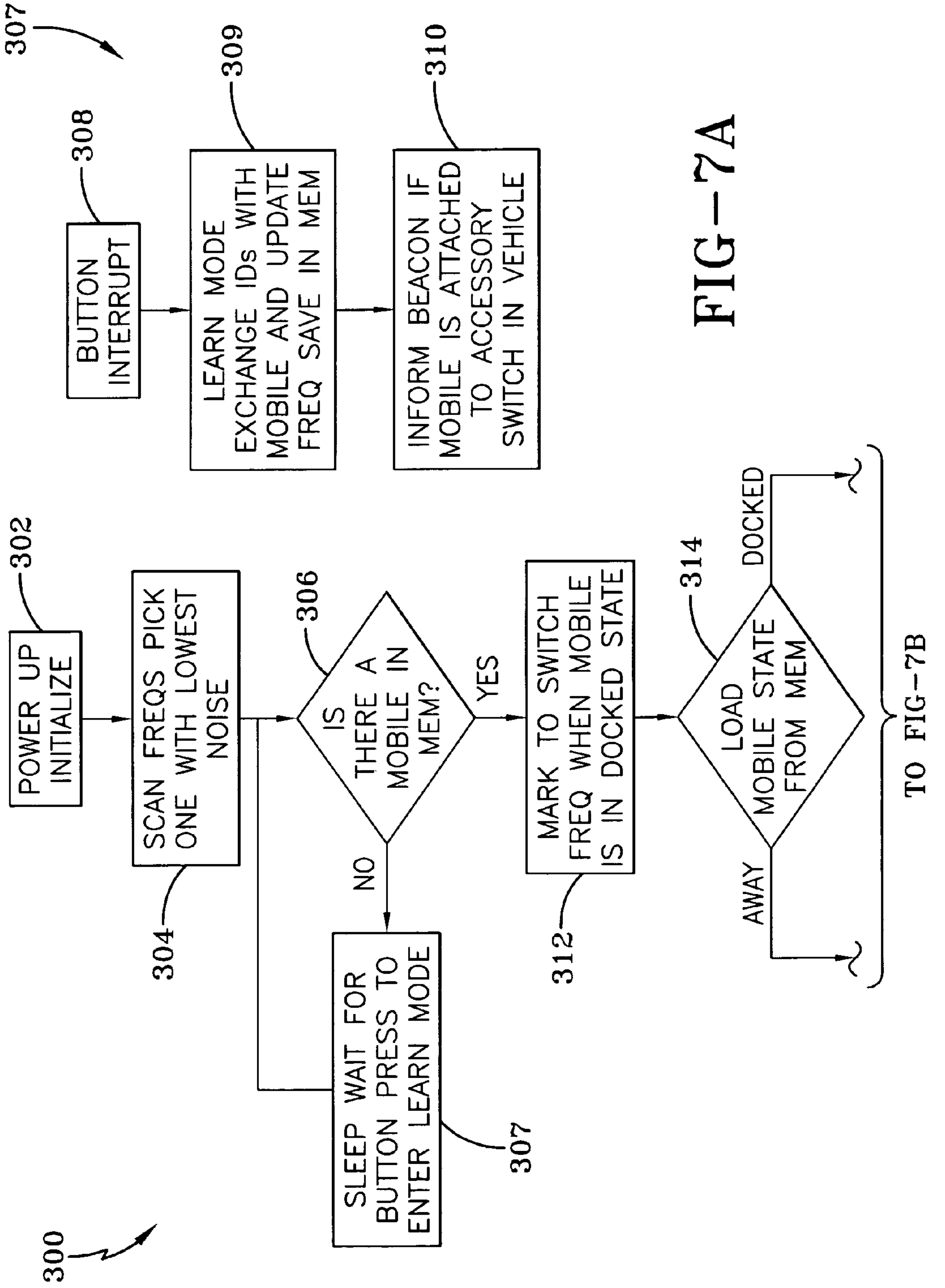
FIGS. 7 A-D present an operational flow chart illustrating the programming and use of an operator system with a proximity device according to the present invention.
Figure 7B:
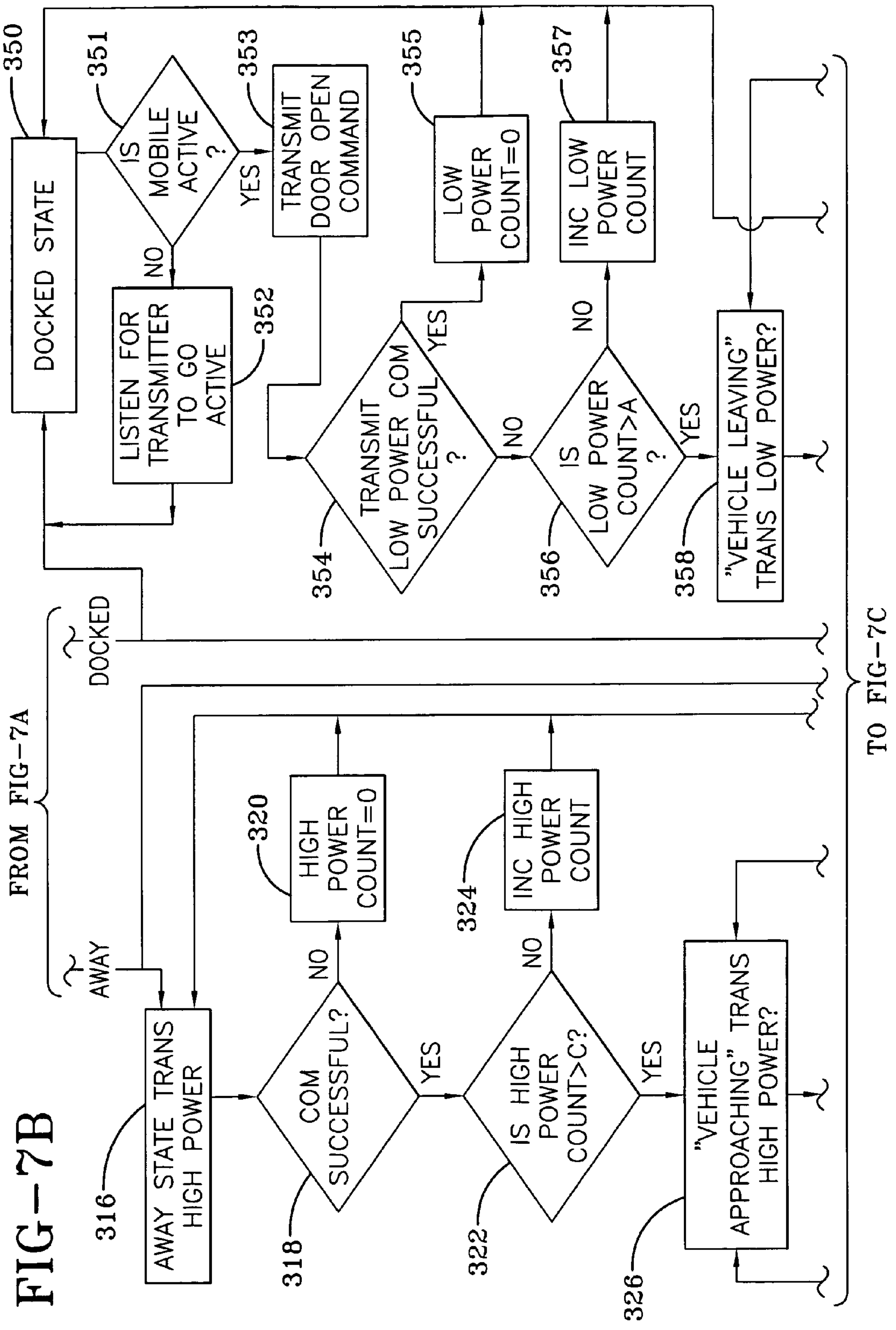
Figure 7C:
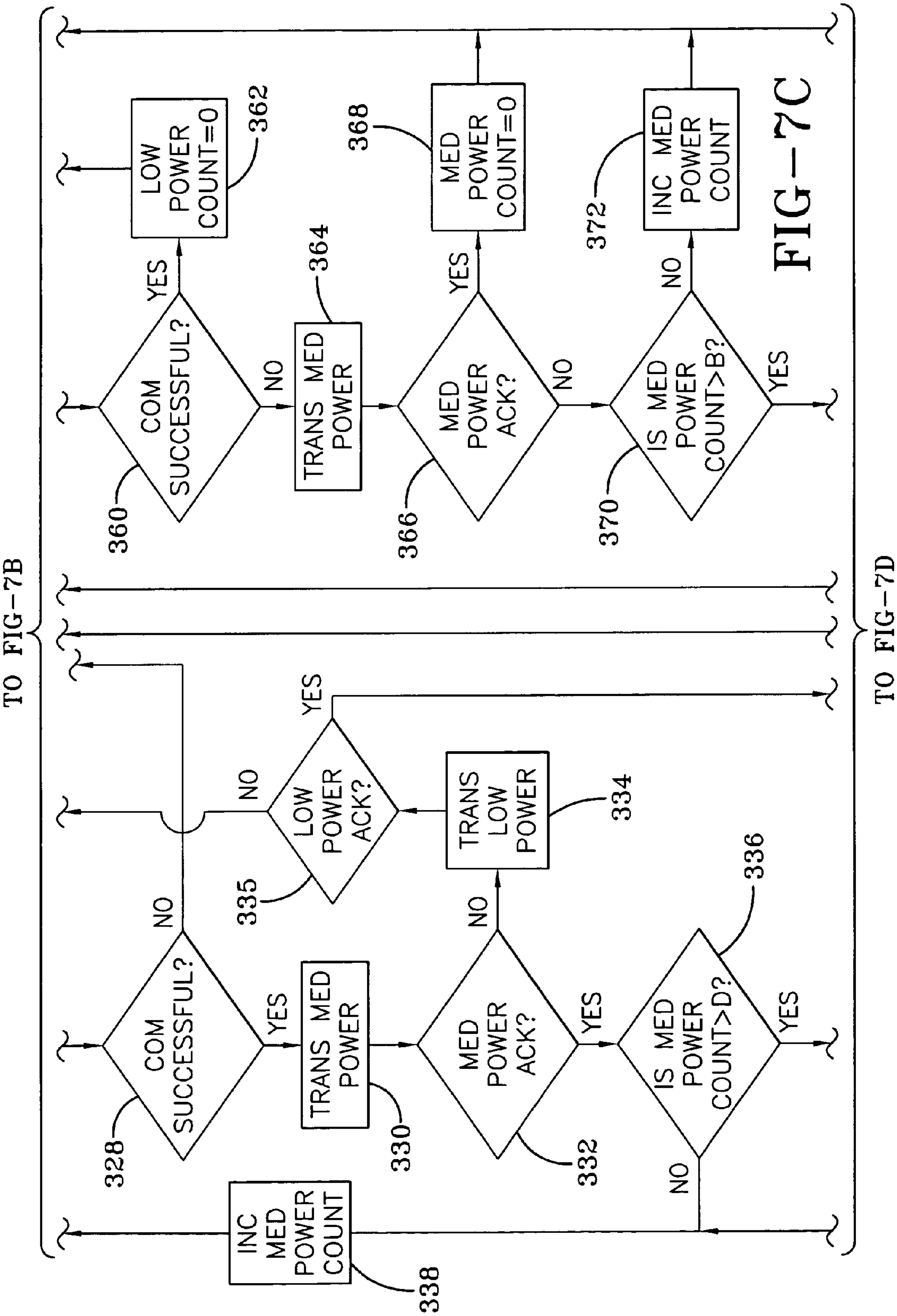
Figure 7D:
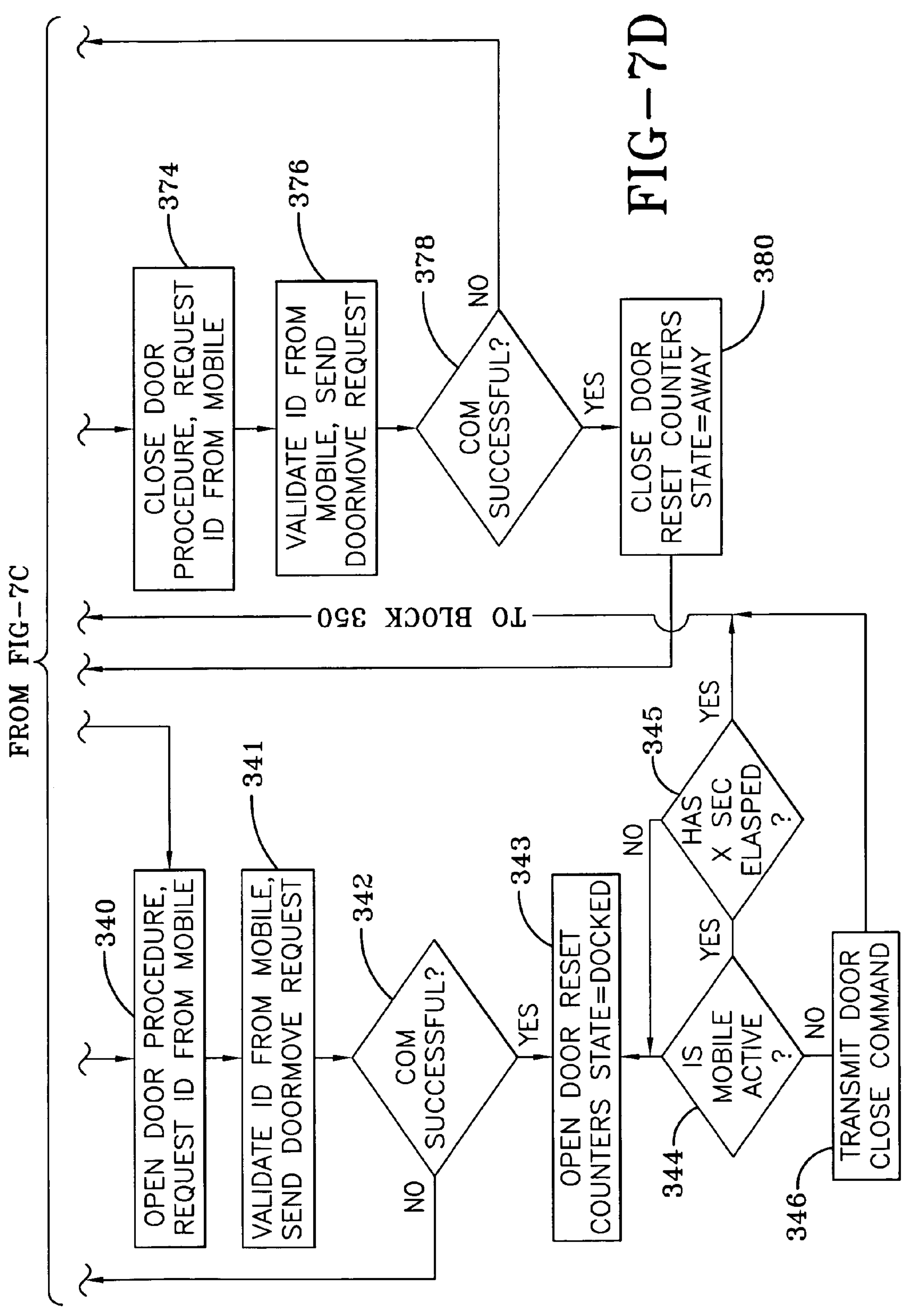

Referring now to FIGS. 4-7, it can be seen that methodologies and structural components are discussed which set out programming of the "sensitivity" of the hands-free device, and also permit the hands-free device to be directly connected to a battery source maintained by the carrying vehicle. The methodology associated with FIGS. 4 and 5 include learning of the proximity transmitter to a controller and the setting of sensitivity levels and associated variables. FIG. 6 provides a detailed schematic of the connection of a proximity device to an accessory switch of the carrying vehicle so as to provide operating power to proximity device. Finally, FIG. 7 provides the methodology of the proximity device which incorporates commands that are initiated when the accessory switch is turned from an on condition to an off condition, and from an on condition to an off condition.

Referring specifically now to FIG. 4, it can be seen that a methodology designated generally by the numeral 200 is implemented for the purpose of learning the proximity device and for changing sensitivity levels. In particular, the methodology 200 includes a step 202 to determine whether the learn button 82 is held in for a predetermined period of time such as five seconds. If the button 83 is not held for the predetermined period time, then the process executes step 204 which allows the proximity device 70 to enter a learn mode wherein the controller 52 is also placed in the learn mode by the end-user. In the learn mode, the proximity device and the controller exchange identification numbers and serial numbers as appropriate and wherein the exchanged serial numbers are saved in each device's corresponding memory device. Upon completion of the learning of the proximity device to the controller, the process continues to step 206 to implement other processing steps.

Returning now to step 202, if the button 82 is actuated for longer than the predetermined period of time, then at step 210 a sensitivity level of the proximity device is changed to a next level using feedback provided by either the light emitting diode or piezoelectric speaker 94. In other words, the light 96 or the speaker 94 may be used to indicate what sensitivity level the proximity transmitter device 70 is at. For example, if the sensitivity level is set at level 2, the light 96 could blink twice or "level two" could be annunciated by the speaker. In the alternative, a liquid crystal display could show the appropriate level. Based upon the device's sensitivity, internal system variables A, B, C, and D are adjusted accordingly. The sensitivity level of the proximity device transmitter may be set at four different levels. It is possible to adjust the sensitivity of the signals generated by the controller 52. This can be done by toggling the switch 58 so that the controller can utilize two different power levels with the beacon transceiver. Accordingly, anywhere from two to eight settings may be incorporated. The table below summarizes the possible settings and the link power level between each.

TABLE I

| data rate (kbps) | receiver mode A | receiver mode B | transmitter output power level (dBm) | link mode A (dBm) | link mode B (dBm) |
|---|---|---|---|---|---|
| 32.7 | −109 | −96 | 0 | 109 | 96 |
| 32.7 | −109 | −96 | 5 | 114 | 101 |
| 32.7 | −109 | −96 | 10 | 119 | 106 |
| 32.7 | −109 | −96 | 15 | 124 | 111 |

Programming the sensitivity levels of the proximity device is considered to be much easier than adjusting the sensitivity of the transceiver. Changing the received sensitivity mode for the beacon transceiver's controller may provide up to a 13 dBm link quality difference. But, it has been found that the output levels are intricately tied to the state logic of the beacon transceiver and the decision making on when to close/open the barrier. As used herein, sensitivity refers to the signal power levels used by the transmitter and the controller to ensure that the transmitter 70 opens and closes the barrier in a way that the end-user can simply drive into and out of their garage without any undue delay or inconvenience. As such, it is preferred to adjust the sensitivity of the proximity device 70 prior to adjusting the sensitivity of the controller. In any event, upon completion of the setting of variables A-D at step 212, the process continues to step 206 and returns to the normal operating routines.

Referring now to FIG. 5, other initial set-up routines may be implemented utilizing the proximity device and this methodology is designated by the numeral 220. These routines provide for override and disabling functions. Accordingly, the proximity device monitors the learn button 82 at step 222 and the input button 83 at step 224. At step 226, the processor 72 inquires as to whether either button 82/83 has been actuated and released, or whether both buttons have been actuated for five seconds (or other predetermined period of time). If neither condition is met, then the step 226 is repeated. If, however, at step 226 either button is released or the time period has timed out, then at step 228 the controller determines whether both buttons remain actuated or not. If both buttons are no longer pressed, then at step 230 the controller inquires as to whether a predetermined period of time has elapsed or not. For example, if a three second period of time has not elapsed, then at step 232, the controller receives a signal from the proximity device and determines which button was actuated for less than three seconds and released. If the button 82 was pressed and released, then the device enters the learn mode at step 234, and as previously discussed with step 204, identification numbers are exchanged. If, however, at step 232, the button 83 was pressed for less than three seconds and then released, then a transmit door move command is generated at step 236 and sent to the controller so as to allow for the proximity device to function as a normal remote transmitter. At step 238, the controller inquires as to whether both buttons have been released or not. If not, then step 238 is repeated until such time that both buttons are released, and once they are then at step 240 the button interrupt routine is exited.

Returning to step 230, if the three second period of time has elapsed and either one of the buttons 82/83 is still held, then the processor determines which one button is still actuated. If it is determined that button 83 is still held, then at step 244, the door move operation is cancelled and the door is stopped and then the process proceeds to step 238 to determine whether both buttons have been released or not. If however, at step 242, the button 82 is being held, then at step 246, the sensitivity setting of the proximity device is changed as previously discussed at steps 210 and 212. Upon completion of step 246, the processor proceeds to steps 238 and 240 as previously discussed.

Returning now to step 228, if both buttons are pressed and held for five seconds or a predetermined amount of time, then the hands-free operation capabilities of the proximity device are disabled or enabled at step 250. This allows the user to toggle between enable and disable operation of the hands-free proximity device as deemed appropriate. Upon completion of step 250, the process proceeds to steps 238 and 240 and, as previously discussed, this interruption process is completed.

Referring now to FIG. 6, and as previously discussed, the proximity device 70 is powered by the carrying device 108. In particular, the carrying device 108 includes an accessory switch 260 connected to a battery 262. The accessory switch is a four-way switch with at least an ignition position and an accessory position. The proximity device 70 includes an accessory terminal, a power terminal, and a ground terminal. The battery's ground terminal 262 is connected to the ground of the proximity device and the power terminal is connected to the positive lead of the battery 262. The accessory terminal is connected to the accessory position such that when a key received by the switch is turned to the accessory position, then the proximity device 70 detects such an occurrence and performs in a manner that will be discussed.

Having the proximity device 70 connected directly to the power supply in a vehicle provides advantages over a solely battery-powered proximity device. The three-wire configuration may be employed wherein a single wire provides constant power from the vehicle's battery. Another wire connects the accessory switch to the vehicle and as such powers the proximity device, and a third wire provides the common ground connection to the vehicle. All three of these signals are normally found in an automobile or electric vehicle. This three-wire set-up could possibly be minimized to a two-wire set-up if the common/ground is attached to a metal chassis of the vehicle. In any event, the proximity device draws power from the constant power supply of the vehicle and uses the accessory circuit as a means of detecting of when the vehicle is energized. By employing such a configuration, there is no need to worry about a "sleep time" for the transmitter device since it is now powered directly by the vehicle battery. As such, the power supply is connected to the proximity device at all times. If the accessory switch is on, the proximity device remains in an active state. However, if the accessory device is off, the proximity device enters a sleep mode to minimize current draw from the vehicle's battery. And it will further be appreciated that the proximity device always has the ability to relay any change of state (active/sleep) information to the beacon transceiver maintained by the operator. By having the proximity device wired direct to the accessory switch, it is possible to have extra features such as an auto-open and auto-close functionality for the garage door operator. As will be described in detail below, detection of the vehicle changing from an off-state to an on-state while the carrying device is within the garage and the barrier is closed, automatically causes the barrier to open. And if the carrying device is moved into the garage and the accessory switch is then turned off, the auto-close feature automatically closes the barrier after a predetermined period of time. For example, for the auto-open feature, the user enters their car and then turns on the ignition. The proximity device would detect that the accessory position—not the ignition position—is now energized and activates the rest of the circuit. The proximity device then transmits a signal to the beacon transceiver relaying the information that the vehicle or carrying device is now active. Accordingly, the controller associated with the beacon transceiver would receive this information and transmit a "door open" command to the operator to open the barrier. At any time after activating the accessory circuit, the person can start the vehicle and leave the enclosed area.

The auto-close feature would work in the following sequence. The user would park the vehicle in the garage and turn the vehicle off. The proximity device would detect that the accessory switch is off and before the proximity device begins a sleep procedure it will transmit the change in status to the beacon transceiver. The beacon transceiver would then transmit a "door close" command to the operator to close the door and upon completion of the door closure operation, the proximity device would enter a sleep mode. Details of the overall operation of the proximity device in relation to the beacon transceiver will now be described.

Referring now to FIGS. 7 A-E, the proximity device—also referred to as "MOBILE" in the drawings—triggers movement of the door by utilizing a series of different power level signals. Accordingly, by emitting a series of high, medium, low, or any other varying levels of power from the beacon transceiver to the mobile proximity device, which responds in turn, it will be appreciated that a position of the vehicle carrying the proximity device and its direction of travel can be determined. And this can be done in a manner that provides the necessary sensitivity to ensure that the position of the vehicle and the direction of travel of the vehicle is appropriate to initiate opening or closing movements of the access barrier. This operational process is designated generally by the numeral 300. This particular variation of the system includes the operator system 34 which is connected to at least one moveable barrier, preferably a garage door, but it is envisioned that the teachings of the present invention may be used for a slidable gate, a residential door, aircraft hanger door, doors of warehouses and the like.

At first step 302, the controller 52 receives power from either a battery or a residential power source or the like. Likewise, power is supplied to the device 70. At step 304, the controller 52 scans for the lowest noise frequency and selects one which allows for operation of the proximity device on the best suited frequency. At step 306 the controller 52 queries the memory device 54 to determine whether a proximity device 70, as identified by an appropriate serial number or the like, is stored in the memory device 54. If not, the controller 52 enters a sleep mode at step 307.

The controller 52 remains in a sleep mode until awakened by a button interrupt step 308. In other words, the controller 52 remains in a reduced power state until the program button 43 provided by a wall station 42 is actuated. It will be appreciated that other sequences of button depressions such as from the keypad transmitter 44 or from the remote transmitter 40 may enable the controller 52 to enter a learn mode. In any event, upon somewhat simultaneous actuation of the program button 43 and the learn button 82 communications between the proximity device 70 and the controller 52 are initiated. Accordingly, identification numbers are exchanged between the proximity device 70 and the controller 52 and a selected frequency is saved in the appropriate memory devices 54 and 74. Once a proximity device is learned it will be initialized to a "docked" state. If a proximity device has been previously learned to the controller, then on power-up of the beacon transceiver 56, the controller will load the proximity last state—either docked or away—that the proximity device was in. It will be appreciated that the proximity device's identification, the selected frequency, and the state are saved in non-volatile memory 54 so if there is a power interruption, the controller reloads the stored values on return of power. Subsequently, at step 310 if the proximity device is connected to the carrying device's accessory switch, this fact is confirmed to the beacon transceiver 56. In any event, upon completion of step 310, the process returns to step 306 wherein the inquiry as to whether a mobile device is stored in memory is answered in the positive and the process proceeds to step 312. At step 312, the mobile proximity device 70 is considered to be in the docked state which means that the proximity device is in relatively close proximity to the controller and is believed to be positioned within the enclosed area 110. In any event, this concludes the initial programming steps previously discussed and the process proceeds to step 314 wherein the operational steps follow. However, it will be appreciated that actuation of the program button 43 automatically returns the device to the initial programming steps so as to allow for re-programming of the proximity device 70 or to allow for additional proximity devices to be associated with a single or multiple controller 52. And it will be appreciated that in this embodiment that the input button 83 on the proximity device is not utilized in a learning or programming mode. However, the button 83 may be used in much the same manner as a known remote transmitter 40 to control operation of the access barrier and override a door movement sequence.

In the docked state, the proximity device is believed to be within the park position. The away state is considered to be away from or out of range of the proximity device with respect to the controller 52. These two states initiate different operational steps in order to determine whether the vehicle is approaching the barrier or whether the vehicle is leaving the area enclosed by the barrier.

If at step 314 it is determined that an away state is in the memory device 54 then the process proceeds to step 316 whereupon the controller 52 and the beacon transceiver 56 generate a "high power" signal 57. This high power signal 57 radiates as far as 250 feet and could be further with an appropriate device. In any event, at step 318 the controller 52 waits to receive a return or acknowledge signal 78 from the proximity device. If an acknowledge signal 78 is not received the communication is considered to be unsuccessful. In other words, the proximity device 70 is beyond the high power signal range. It will further be appreciated that the controller always expects the acknowledge signal 78 to be returned. And the proximity device 70 will not return an acknowledge signal if the signal 57 is not from a beacon transceiver 56 that it was learned to. At step 320 a counter, which is maintained by the controller 52, sets a high power count equal to a zero value. The process then returns to step 316 wherein a high power value is emitted again after a predetermined time. If the high power count is equal to zero, then the controller 52 will wait at least one second before generating another high power signal. In this way, battery power of the device can be conserved.

If at step 318 it is determined that a successful communication has taken place—high power signal emitted and acknowledged—then the process proceeds to step 322 wherein the value stored in the high power count is compared to a predetermined variable value C. If the count is not greater than C then the process proceeds to step 324 wherein the high power count value is incremented by a value of one. Following the incrementing step the process returns to step 316 whereupon steps 318 through 322 are repeated. This process loop continues until the high power count is greater than variable value C whereupon the process proceeds to step 326 wherein it is believed that the repeated confirmation of a high power signal being returned indicates that the vehicle is approaching the enclosed area 110. Accordingly, at step 326 a high power signal is once again transmitted. This is done so as to confirm that the proximity device is indeed within range of the controller. If such a communication is unsuccessful, then at step 328 the process returns to step 316 and steps 318-324 are re-executed.

If at step 328 a high power communication is deemed to be successful then the controller 52 at step 330 transmits a "medium power" signal 57. The medium power signal radiates about 150 feet for the purposes disclosed herein. If such a medium power signal is not received and acknowledged by the proximity device 70 at step 332 the controller 52 then transmits a "low power" signal 57 at step 334. If the low power signal is not acknowledged at step 335 then the process returns to step 326. If however, the low power signal is acknowledged at step 335 the process proceeds to step 340 which will be discussed in detail below.

Returning to step 332, if the proximity device 70 confirms or sends an acknowledgment signal that the medium power signal has been accepted, then the process proceeds to step 336. At step 336, the controller queries as to whether a medium power count is greater than a variable designated by the letter D. If not, then at step 338 the medium power count is incremented by one and the process returns to step 326 and steps 328-332 are repeated.

If at step 336 it is determined that the medium power count is greater than the variable D, the process proceeds to step 340. By requiring the count level to be reached this confirms to the controller 52 that the vehicle is within a medium power range for a predetermined period of time. In the alternative, if at step 335 the medium power range is quickly bypassed and a low power signal is detected, which indicates that the vehicle is in very close proximity to the access barrier, then an open door procedure is executed or initiated at step 340.

At step 340, the controller 52 inquires as to the identification of the proximity device 70. At step 341 if it is determined that the identification of the proximity device corresponds to that stored in the memory device 54 at step 342 then a door remove request is initiated by the controller 52 to the motor 60 which in turn moves the drive shaft 36 and begins opening movement of the access barrier at step 343. If the validation step 341 is not successful, as indicated at step 342, then the process returns to step 338 and ultimately to step 326 to re-initiate steps 328-341. Upon completion of the door opening, the counters C and D are reset to a predetermined, presumably zero value. Additionally, at step 343 the memory state of the mobile device is changed from AWAY to DOCKED. Upon completion of step 343 the processor controller determines whether the mobile device is in an active condition or not at step 344. If it is determined that the mobile or proximity device is active, then the controller determines whether a certain period of time has elapsed at step 345. If the predetermined time period has not elapsed, then the process returns to step 344. If the time period has elapsed then the process returns to step 350 and the proximity device is considered to be in a docked state—in other words, the proximity device and the carrying vehicle is in a parked position with respect to the enclosure but the carrying device is still active. As such, the auto-close feature is bypassed.

Returning to step 344 if it is determined that the mobile device is no longer active, or in other words, the accessory switch has been turned off within the predetermined period of time, then the proximity device transmits a door close command at step 346. Upon completion of the door close command the proximity device returns to a sleep mode and then the process continues on to step 350. Accordingly, at step 350 execution of the steps for when the proximity device 70 is considered to be in a docked or parked condition are implemented.

At step 350, with the controller memory indicating that the proximity device is in a docked state, the transceiver 56 determines whether the carrying device and in turn the proximity device is active or not at step 351. If the mobile device is not active, then at step 352 the proximity device enters a sleep mode and listens for the proximity device or transmitter to go active and returns to step 350. However, if it is determined that at step 351 that the mobile device is active, then a transmit door open command is generated at step 353 if the controller confirms that the door is in a closed condition. In other words, if the proximity device is in a docked state, which is presumably an indication that the car is parked in the garage and the user turns the ignition key to the accessory switch position, the proximity device becomes active and as such the door is automatically opened and then the user may exit the garage. Upon completion of the door open command, the process continues to step 354 wherein the proximity device transmits a lower power communication or power signal 57. If the low power signal is received and an acknowledge signal generated then at step 355 a low power count is set to a zero value. However, if at step 354 it is determined that the communication of a low power signal is not successful then the process proceeds to step 356. In other words, it is envisioned that the proximity device is moving from a low range area to a medium power range area. In any event, at step 356 if a low power count is not greater than a variable A then at step 357 the low power count is incremented by one and the process returns to step 350. If however, at step 356 it is determined that the low power count is greater than A, then the process proceeds to step 358 wherein it is envisioned that the vehicle is confirmed to be moving away from the enclosure or garage. Accordingly, at step 358 the confirming signal is sent at low power and if that communication is successful at step 360 then at step 362 the low power counter is reset to zero value and steps 350-357 are re-executed. This indicates that the vehicle, although likely moving away from the enclosure has not moved completely away. If however, at step 360 it is determined that the low power signal 57 is not returned, then the controller 52, through the beacon transceiver 56 emits a medium power signal 57 at step 364. Following this, the controller awaits for receipt of an acknowledgment signal at step 366. If acknowledgment signal is received then a medium power count is set to zero at step 368 and the process returns to step 358.

If however, at step 366 a return signal is not generated subsequent to the actuation of a medium power signal then the process proceeds to step 370 whereupon the controller determines whether the medium power count is greater than a variable designated generally by the numeral B. If this count or variable value B has not yet been reached then at step 372 the medium power count is incremented by 1 and steps 358-366 are repeated.

If at step 370 the medium power count is greater than B, which means the vehicle is determined to be outside the medium power range, then at step 374 the close door procedure is initiated. Included in this step is a request for identification from the controller to the proximity device which is then returned to the controller 52. If the controller validates the coded identification sent from the proximity device 70 at step 376 then a door move request is sent. If this request is acknowledged at step 378, then the controller 52 generates a signal to the motor 60 for turning the drive shaft 36 and the controller proceeds to close the door wherein it is envisioned that this step is taken when the proximity device has traveled from the low to the medium range of the controller and as such the door is instructed to close. If however, at step 378 such a validation is not successful then the process returns to step 358 for re-execution of steps 360-376. If however, at step 378 it is determined that the validation request is successful then at step 380 the door is closed, the counters are reset and the state of the proximity device is changed from DOCKED to AWAY and the process returns to step 316.

This invention is advantageous in that the learning procedure is much simplified inasmuch as only a single actuation of the program button 43 is required and wherein the direction of travel of the proximity device is determined by transmitting at least two and more likely three different power signal levels which may or may not be returned by the proximity device so as to determine its direction of travel with respect to the beacon transceiver and as such the controller 52. It will further be appreciated that by adjusting the variables A, B, C and D, various sensitivity levels can be set. In other words, by selecting the number of times the medium power or lower power signals are acknowledged, the time between opening and closing the doors can be minimized or maximized depending upon the length of the driveway or access area and also depending upon the interference that may be caused by corresponding devices. Yet another advantage of this embodiment is that the design triggers a door open movement from a proximity device's transition from a high power range to a medium power range, and the controller triggers a door close movement from a transition from a low power range to a medium power range. This prevents a situation where one could find a spot where the RF signal is intermittent and with out moving the mobile carrying device could cause the door to oscillate between positions. The setting of variables B and D are important to ensure proper operation of the system.

Still other advantages of the present invention are realized by the incorporation of an auto-close and auto-open functionality with the proximity device. This is accomplished by directly connecting the proximity device to a power source associated with the carrying device or vehicle. Accordingly, after the proximity device opens the barrier virtue of the carrying vehicle approaching the barrier, the barrier then may automatically be closed by detecting a change in the vehicle from an on condition to an off condition. In a similar manner, the proximity device provides an auto-open feature for when the barrier is closed and the proximity device detects that the accessory switch is turned on. Accordingly, the barrier is opened and the vehicle may exit the enclosed area and the proximity device may then operate in a manner such that when the device is confirmed to be leaving the barrier, the barrier is automatically closed. Still further advantages of the present invention are realized by the ability to set power sensitivity levels associated with the proximity device and the operator controller. Although the setting of system variables A-D allows for adjustment and when signals are acknowledged, the setting of power levels with the proximity device allow for increased or decreased range as deemed appropriate by the end-user. The ability to adjust these various types of sensitivity settings allows for the user to enter and leave an area enclosed by a barrier in an efficient manner without having to physically actuate the transmitter device manually. This also allows the end-user to enter and leave an area slowly without stopping for their convenience.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. An operator system for automatically controlling access barriers, comprising a controller associated with at least one access barrier;

at least one beacon transceiver associated with said controller for transmitting and receiving operational signals; and at least one proximity device adapted to be associated with a powered carrying device, wherein said proximity device comprises a transponder;

a processor connected to said transponder, said processor in communication with said controller via said at least one beacon transceiver; and a plurality of wire leads connected to said processor, wherein said plurality of leads are connectable to a power supply of the powered carrying device, and wherein said processor detects when the powered carrying device is either in an on condition or an off condition;

said at least one proximity device capable of communicating operational signals with said at least one beacon transceiver, said operational signals based upon an operational status of the powered carrying device and a position of said proximity device with respect to the barrier, the position of said proximity device determined by the successful receipt of a predetermined number of power level signals communicated between said beacon transceiver and said proximity device, wherein said controller monitors said operational signals and said power level signals and controls the position of the access barrier based upon said operational signals and said power level signals and whether the powered carrying device is an on or off condition.

2. The operator system according to claim 1, wherein said controller is associated with a program button, wherein actuation of said program button prepares the controller for a learn phase for receipt of initial operational signals from said at least one proximity device.

3. The operator system according to claim 2, wherein said proximity device is placed within range of said beacon transceiver so that said controller learns said mobile transponder's identity upon actuation of said program button during said learn phase; and wherein upon completion of said learn phase said beacon transceiver is enabled to periodically generate a beacon signal having at least two different power levels.

4. The operator system according to claim 3, wherein said mobile transponder generates an acknowledge signal that is detected by said controller and wherein said controller includes a memory device that stores a position state corresponding to whether said acknowledge signal is received by said controller within a predetermined period of time.

5. The operator system according to claim 4, wherein said position state is designated as one of AWAY or/and DOCKED depending upon return of said acknowledge signal and said beacon signal's power level.

6. The operator system according to claim 5, wherein if said position state is DOCKED and said powered carrying device changes from said off condition to said on condition an open command is sent from said proximity device to said at least one beacon transceiver.

7. The operator according to claim 5, wherein if said position state is DOCKED and said powered carrying device changes from said on condition to said off condition, a close command is sent from said proximity device to said at least one beacon transceiver.

8. An operator system for automatically controlling access barriers, comprising a controller associated with at least one access barrier, wherein said controller includes a sensitivity button;

at least one beacon transceiver associated with said, controller for transmitting and receiving operational signals, wherein actuation of said sensitivity button provides at least two sensitivity levels for transmitting beacon operational signals; and at least one proximity device adapted to be associated with a powered carrying device, said at least one proximity device capable of communicating operational signals with said at least one beacon transceiver, wherein said at least one proximity device provides at least two sensitivity levels for transmitting proximity device operational signals, and wherein said controller monitors said proximity device and beacon operational signals and controls the position of the access barrier based upon the successful receipt of a predetermined number of operational signals transmitted between said beacon transceiver and said proximity device which is dependent upon the sensitivity levels of said proximity device and said beacon transceiver.

9. The operator system according to claim 8, wherein said at least one proximity device comprises a transponder;

a processor connected to said transponder, said processor in communication with said controller via said at least one beacon transceiver; and a learn button connected to said processor.

10. The operator system according to claim 9, wherein actuation of said learn button associates said proximity device with said controller.

11. The operator system according to claim 9, wherein actuation of said learn button for a predetermined period of time changes said sensitivity level of said proximity device.

12. The operator system according to claim 9, wherein said at least one proximity device further comprises an input button connected to said processor.

13. The operator system according to claim 12, wherein actuation of said input button causes said transponder to generate a door move command.

14. The operator system according to claim 13, wherein actuation of said input button causes said transponder to cancel said door move command.

15. The operator according to claim 12, wherein simultaneous actuation of said learn button and said input button toggles said proximity device between active and inactive operation.

16. A method for automatically controlling operation of an access barrier based upon a relative position of a vehicle with respect to the barrier, comprising providing a controller to control the opening and closing movements of the access barrier;

carrying a proximity device in the vehicle, said proximity device detecting a change in the vehicle's on/off condition and;

communicating a plurality of power level signals between said controller and said proximity device:

adjusting a sensitivity level for both said controller and said proximity device;

determining if said proximity device is approaching or moving away from the access barrier based on whether said proximity device and said controller have successfully communicated a predetermined number of power level signals at said set sensitivity levels, such that when said carrying device is approaching the access barrier in a closed condition, said controller opens the access barrier, and when said carrying device is moving away from the access barrier in an open condition, said controller closes the access barrier; and detecting a change in the vehicle's on/off condition and changing the access barrier's condition a predetermined period of time after the change in the vehicle's on/off condition.

17. The method according to claim 16, further comprising receiving an operational status signal from the vehicle by said proximity device.

18. The method according to claim 17, further comprising opening the access barrier when said operational status signal indicates the vehicle changing from an off condition to an on condition and said controller determines that the carrying device is in close proximity.

19. The method according to claim 17, further comprising closing the access barrier when said operational status signal indicates the vehicle changing from an on condition to an off condition and said controller determines that the carrying device is in close proximity.

20. A method for adjusting power sensitivity of a hands-free proximity device used to initiate automatic movement of an access barrier, comprising providing a controller to control the opening and closing movements of the access barrier;

providing a proximity device with a learn button;

actuating said learn button to associate said proximity device with said controller;

adjusting power levels of both said proximity device and said controller to change the power sensitivity of signals transmitted therebetween;

actuating said learn button in a first way to associate said proximity device with said controller; and actuating said learn button in a second way to adjust the power sensitivity of signals generated by said proximity device.

21. The method according to claim 20, further comprising providing said proximity device with an input button.

22. The method according to claim 21, further comprising actuating said input button to automatically move the access barrier as long as said proximity device is in operational range of said controller.

23. The method according to claim 22, further comprising actuating and holding said input button subsequent actuating step so as to cancel automatic movement of the access barrier.

24. The method according to claim 20, further comprising actuating and holding said learn button and said input button to toggle said proximity device between active and inactive operation.

25. The method according to claim 20, further comprising providing said controller with an adjustment button; and actuating said adjustment button to adjust the power sensitivity of signals generated by said controller.

* * * * *